United States Patent [19]

Roche et al.

[11] 3,980,495
[45] Sept. 14, 1976

[54] CALCIUM ALLOY AS ACTIVE MATERIAL IN SECONDARY ELECTROCHEMICAL CELL

[75] Inventors: Michael F. Roche, Lombard; Sandra K. Preto, Stickney; Allan E. Martin, Woodridge, all of Ill.

[73] Assignee: The United States of America as represented by the United States Energy Research and Development Administration, Washington, D.C.

[22] Filed: Dec. 19, 1975

[21] Appl. No.: 642,438

[52] U.S. Cl. ............................... 429/207; 429/218; 429/221
[51] Int. Cl.[2] ........................................ H01M 10/00
[58] Field of Search ............ 136/20, 6 LF, 6 F, 6 L, 136/155, 83 T

[56] References Cited
UNITED STATES PATENTS

| | | |
|---|---|---|
| 3,933,521 | 1/1976 | Vissers et al. .................. 136/20 X |
| 3,941,612 | 3/1976 | Streunemberg et al. .......... 136/20 X |
| 3,947,291 | 3/1976 | Yao et al. ........................ 136/20 X |

*Primary Examiner*—John H. Mack
*Assistant Examiner*—C. F. Lefevour
*Attorney, Agent, or Firm*—Dean E. Carlson; Arthur A. Churm; Hugh W. Glenn

[57] ABSTRACT

Calcium alloys such as calcium-aluminum and calcium-silicon, are employed as active material within a rechargeable negative electrode of an electrochemical cell. Such cells can use a molten salt electrolyte including calcium ions and a positive electrode having sulfur, sulfides, or oxides as active material. The calcium alloy is selected to prevent formation of molten calcium alloys resulting from reaction with the selected molten electrolytic salt at the cell operating temperatures.

8 Claims, 4 Drawing Figures

CALCIUM ALLOY AS ACTIVE MATERIAL IN SECONDARY ELECTROCHEMICAL CELL

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to high temperature, secondary electrochemical cells and batteries of such cells that can be employed as power sources for electric automobiles, hybrid electric vehicles or for the storage of electric energy generated during intervals of off-peak power consumption. It is particularly applicable to electrochemical cells that employ molten electrolytic salts as an electrolyte and metal oxides, sulfides or sulfur as positive electrode reactants. Examples of cells of these types are presented in U.S. Pat. No. 3,907,589 to Gay et al., entitled "Cathode for a Secondary Electrochemical Cell"; and in U.S. patent applications Ser. Nos. 555,317 to Steuenberg et al. entitled "Improved Cathode Composition for Electrochemical Cell"; and Ser. No. 510,840 to Yao et al., entitled "Electrochemical Cell Assembled in Discharge State". Each of the above are assigned to the assignee of the present application.

In these previous cells lithium, sodium, or lithium-aluminum alloys have been proposed as negative electrode active materials. Some of the cells operate with lithium or sodium metal in molten state at a sufficiently high temperature to provide a molten electrolytic salt. However, the use of molten metals or molten metal alloys as active materials presents difficult engineering problems. Special procedures have been required to retain the molten material within the electrode, for example, see allowed U.S. patent application Ser. No. 549,635, to Vissers et al., entitled "Improved Anode for a Secondary, High-Temperature Electrochemical Cell". Also, electrical shorting and materials attack have resulted from the molten active materials.

Other cells employing solid lithium-aluminum alloys as electrode material have been prepared and operated with considerable success. However, lithium is a scarce and expensive element while calcium and sodium are more abundant. By employing electrodes and electrolytes that predominately include calcium, its halides and the halide salt of sodium, electrochemical cells of potentially reduced cost can be provided.

Various cells have been proposed that employ calcium metal as a negative electrode reactant. These cells are generally primary cells that are not rechargeable. For instance, thermally activated, primary cells have used calcium as active material with alkali metal halides and alkali earth metal halides for the electrolytic salt. The electrolyte is originally solid, but fuses on temperature rise to activate the cell. Where lithium or sodium halides are employed as constituents within the electrolytic salt, liquid calcium-lithium or sodium-calcium alloy can be produced by reaction between the electrolyte and the solid calcium metal electrode. Liquid alloy formation is undesirable in secondary cells with molten electrolytes because it can lead to electrical shorting and various engineering difficulties. For example, molten alloys of such reactive metals are highly corrosive to ceramic and insulative materials and can also undergo wicking within fabric insulators and separators.

SUMMARY OF THE INVENTION

In view of the foregoing it is an object of the present invention to provide a secondary electrochemical cell with calcium in solid alloy form as active material within the negative electrode.

It is a further object to provide such a secondary electrochemical cell that can be cycled without formation of substantial amounts of molten alloy material at the cell operating temperature.

In accordance with the present invention a secondary electrochemical cell is provided including a negative electrode, a molten salt electrolyte and a positive electrode with an active material of sulfur, sulfur compounds or other chalcogens and their compounds. The improvement lies in the negative electrode that contains, as active material, a solid calcium-metal alloy including calcium and one or more elements selected from groups 1A, 2A, 3A and 4A of the Periodic Table.

In a more specific aspect of the invention calcium in the negative electrode is alloyed with elements of the selected group having lower atomic weights than calcium. Calcium-aluminum, calcium-silicon, calcium-carbide, calcium-boride, calcium-beryllium, calcium-magnesium are all contemplated as two component alloy systems within the scope of the present invention. Of these, two components systems calcium-silicon and calcium-aluminum have been found to be preferred in respect to performance and availability. Ternary and quaternary alloy systems are also contemplated. Systems including calcium-aluminum-silicon, calcium-lithium-silicon, calcium-lithium-aluminim and calcium-aluminum-silicon-lithium are likely choices of alloy systems capable of providing calcium as active, negative-electrode material within rechargeable electrochemical cells. Other systems may also be available including ternary and quaternary systems of calcium along with boron, carbon, beryllium and magnesium as well as the other alloying materials previously set forth. Each of these alloy systems advantageously include calcium as either an intermetallic compound or as the solute within a solid solution. Phases including calcium in such predominate proportions as to form substitutional solid solutions with elemental calcium as solvent are subject to, on recharge, electrolyte degradation with possible molten calcium alloy formation.

DESCRIPTION OF THE PREFERRED EMBODIMENT

Figure 1:
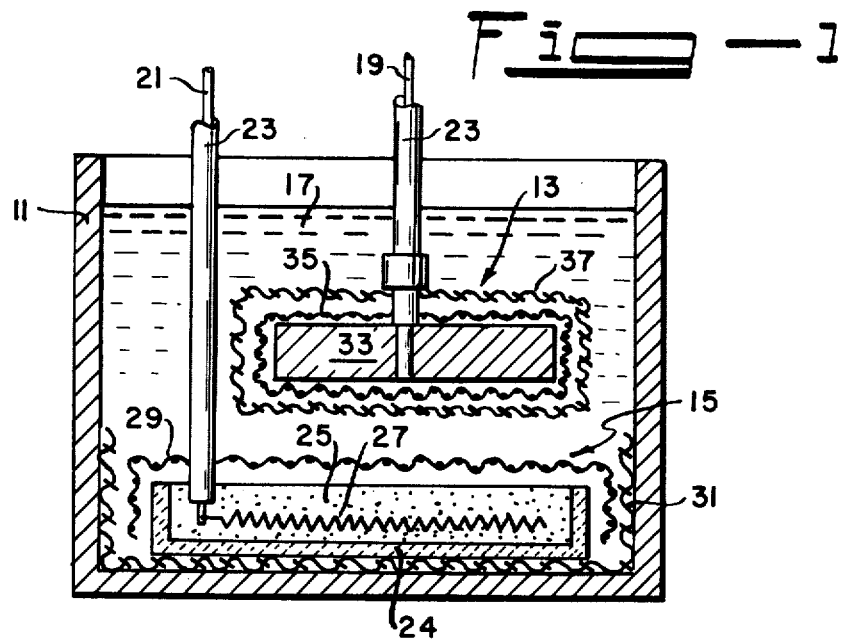
FIG. 1 is a generally schematic elevation view of a secondary electrochemical cell to demonstrate the operation of the present invention.

In FIG. 1 a laboratory electrochemical cell is shown contained within a crucible 11. The cell includes a negative electrode 13 and a positive electrode 15 submerged within a molten electrolytic salt 17. Electrical conductors 19 and 21 extend from the respective electrodes through insulative jackets 23.

The positive electrode 15 can be of any suitable design and contain any suitable active material for operation in conjunction with applicants' novel negative electrode 13. Positive electrode 15 can contain sulfur, metal sulfides, metal oxides or other chalcogens as the active material and can be assembled in various known manners including, for example, as shown in U.S. Pat. Nos. 3,907,589; 3,884,715; 3,716,409; 3,827,910 and allowed U.S. patent applications Ser. Nos. 565,021; 510,840; and 555,317.

As shown, positive electrode 15 includes a ceramic and electrically insulative cup 24 containing particulate metal sulfide 25 and an electrically conductive current collector 27 connected to conductor 21. Current collector 27, although shown as a continuous conductor, could also comprise a porous, electrically conducting substrate having the metal sulfide particles distributed within it. The positive electrode is shown retained within a metal screen 29 and an electrically insulative separator cloth 31.

The electrolyte is a mixture of alkali metal halides and alkaline earth metal halides including at least one calcium salt for providing calcium ions. As examples, eutectic mixtures and other mixtures of reduced melting point including calcium chloride, potassium chloride, sodium chloride, and lithium chloride could be employed. Mixtures including major portions of calcium chloride and sodium chloride or sodium bromide are preferred due to the abundance and inexpensive character of these salts. As an example, these salts form an eutectic composition at 47 mol % sodium chloride and 53 mol % calcium chloride having a melting point of 506°C. Table I lists some of the various salt combinations that can be employed. Freezing points given correspond to where the first solid forms on cooling the molten phase, that is the liquidus temperature. In the case of an eutectic composition, the values will also correspond to the melting point.

TABLE I

| Salt Mixture | Freezing Point °C. |
|---|---|
| $CaCl_2$—NaCl (53-47 mol %) | 506 |
| $CaCl_2$—LiCl (50-50 mol %) | 503 |
| $CaCl_2$—LiCl—KBr (36-56-10 mol %) | 417 |
| CaCl—CaF—LiCl—KBr (29-4-54-13 mol %) | 407 |
| NaBr—KF—$CaCl_2$ (42-5-53 mol %) | 457 |
| $CaCl_2$—LiCl—KCl (5-56-39 mol %) | 346 |

Negative electrode 13 is illustrated as an electrically conductive porous substrate 33 containing the particulate, negative electrode active material. Substrate 33 is contained within mesh or screen 35 and an electrically insulative fabric 37, e.g. of boron nitride. Electrode structures of this type are advantageously provided in the manner shown in allowed patent application Ser. No. 565,021 entitled "Method of Preparing Electrodes with Porous Current Collector Structures and Solid Reactants for Secondary Electrochemical Cells". This patent application is hereby incorporated by reference to illustrate the vibratory loading of solid reactant material into a porous substrate.

The negative electrode active material is an alloy of calcium and one or more lighter materials selected from groups 1A, 2A, 3A or 4A of the Periodic Table, for instance, lithium, beryllium, sodium, magnesium, potassium, boron, carbon, aluminum or silicon.

Figure 2:
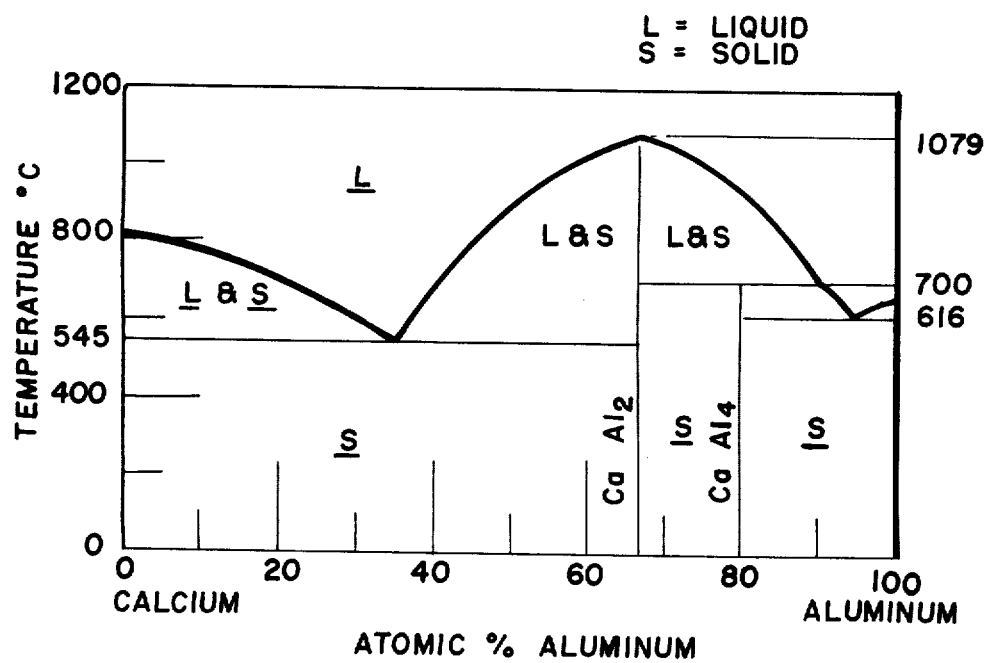
FIG. 2 is a binary phase diagram of calcium and aluminum.
Figure 3:
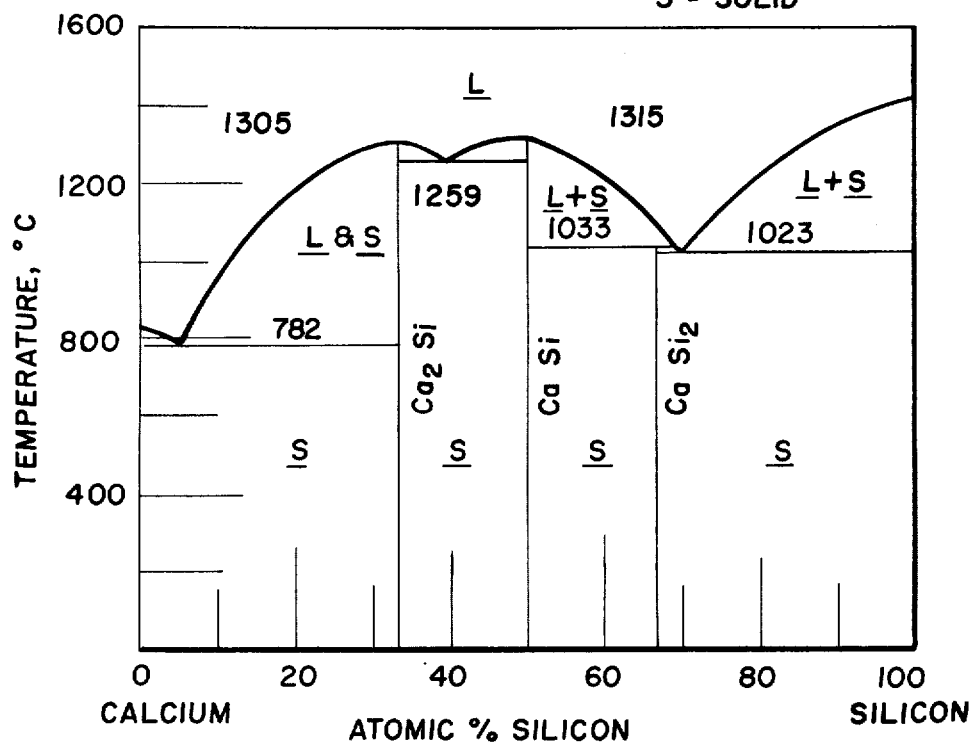
FIG. 3 is a binary phase diagram of calcium and silicon.
Figure 4:
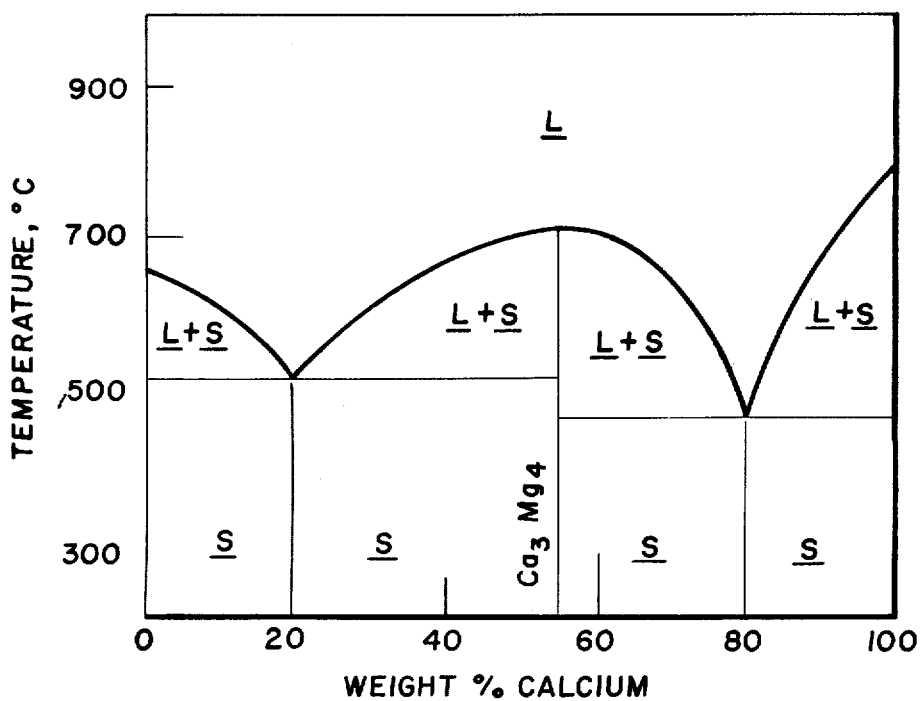
FIG. 4 is a binary phase diagram of calcium and magnesium.

FIGS. 2, 3 and 4 show equilibrium phase diagrams for the systems Ca-Al, Ca-Si and Ca-Mg taken from the published literature. These diagrams are useful in defining the limits of the more specific aspects of the present invention by showing constituent limits on intermediate phases. For example in FIG. 2, it is seen that two intermetallic compounds, $CaAl_2$ and $CaAl_4$ exist in the solid phase portions of this system. An intermediate solid phase is defined between these compositioned limits i.e. 67 to 80 atom percent aluminum and below 700°C. Calcium-aluminum compositions within this defined range are particularly well suited as calcium alloys for use in the negative electrode of the present invention. These alloy compositions do not include calcium metal as the base-alloy solvent in a solid solution. Consequently on recharging a cell having a negative electrode of this alloy, the cell can be completely recharged to form these intermetallic compounds at a lower potential than would be required to recharge a cell having calcium metal as solvent in a calcium aluminum alloy. It is also expected that alloys having slightly more than 33 atom percent calcium could also enjoy the recharge advantage as long as the calcium in excess of that in $CaAl_2$ is distributed as solute within a solid solution lattice of $CaAl_2$. By employing alloys within this preferred range, the possibility of forming molten calcium alloys, e.g. Ca-Li and Ca-Na from electrochemical reactions with the electrolyte during recharge is substantially reduced.

It will also be clear that calcium-aluminum alloys having in excess of 80 atom percent aluminum could also be used to the same advantage as explained above. However, these alloys are approaching levels of calcium too low, e.g. below 20 wt % calcium to be effective in providing electrochemical cells with high specific energy and specific power (energy/weight and power/weight).

FIG. 3 is the phase diagram for the calcium-silicon system. $Ca_2Si$, CaSi and $CaSi_2$ are shown as intermetallic compounds in this system. Solid intermediate phases are seen between the $Ca_2Si$ and $CaSi_2$ composition lines e.g. 33 and 67 atom % silicon within this range sufficiently high calcium concentration, e.g. above 20 weight % calcium is obtained without the presence of substantial amounts of elemental calcium forming a solvent lattice structure. As explained in regard to the calcium-aluminum system small solute quantities of calcium metal within a $Ca_2Si$ lattice could be employed without losing the advantages of the present invention.

In FIG. 4 the calcium-magnesium system is presented. Since only one intermetallic compound, $Ca_3Mg_4$ appears, no intermediate phases exist in this system. However, alloys having calcium composition near to and below that of $Ca_3Mg_4$ can be employed as negative electrode material. In using the calcium magnesium system, electrolytes must be carefully chosen so as to have suitably low freezing points.

Although negative electrode 13 and the other components of the cell are illustrated as specific structures, it will be clear that various other structural arrangements known in the art can also be employed. For instance, the negative electrode current collector structure not only can be the porous substrate 33 as illustrated, but also could be an arrangement of single conductors, electrically conductive, metal or carbon powders intermixed with the negative electrode active material or various other known current collector structures.

In order to more clearly illustrate the present invention, the following examples are presented.

EXAMPLE I

A secondary electrochemical cell in the discharged state was constructed in substantially the configuration shown in the Figure. The negative electrode included small diameter aluminum wire and stainless steel screen wrapped in zirconia and boron nitride cloth. The positive electrode included calcium sulfide and iron powders in an alumina cup with a foamed-iron current collector wrapped in suitable retainer screens and cloths. The cell electrolyte was 34 weight percent sodium chloride and 66 weight percent calcium chloride, a eutectic mixture having a melting point of 506°C. The loading of the two electrodes was calculated to provide on full charge 6 A-hr of $CaAl_2$ in the negative electrode and an excess of FeS in the positive electrode. Since calcium forms compounds with aluminum and sodium does not, the cell could be operated at a lower charge potential than that required to form molten calcium-sodium alloy thus preventing degradation of the electrolyte.

The cell was operated at about 550°C. for ten cycles at a current of approximately 0.4 to 0.9 A charge and 0.2 to 0.6 A discharge. Cutoff voltages of about 1.7 to 2.0 volts were employed on charge and 0.6 to 1.2 volts on discharge. Open circuit voltage plateaus of 1.65 V and 1.35 V corresponding to $CaAl_2$ and $CaAl_4$ were found.

EXAMPLE II (CELL SP-2)

$CaAl_2$ was prepared by fusion of the elements at about 1100°C. in a zirconia crucible. Metallographic and X-ray examination confirmed that the product was mostly single-phase $CaAl_2$. The material was comminuted to approximately 100 micrometer particle size and vibratorily distributed within a porous substrate of foamed stainless steel for use as a negative electrode. The positive electrode included FeS, distributed in a current-collector structure. The cell was operated through 14 discharge and charge cycles of about 0.8 volt cutoff discharge and 1.8–1.9 volt charge cutoff. The electrolyte was molten $CaCl_2$-NaCl at an operating temperature of about 550°C. Currents were typically 0.6 A on discharge and 0.3 to 0.6 A on charge. The cells A-hr efficiency was near 100%. The capacity and voltage indicated that the negative electrode was cycling between $CaAl_4$ and Al. The cell was terminated after the 14th charge cycle and metallographic examination of the negative electrode revealed a major phase of $CaAl_4$ and minor dispersals of $CaAl_2$ within the $CaAl_4$. No aluminum was detected.

EXAMPLE III (CELL LR-1)

$CaAl_2$, of the type employed in Example II (above) was used as the negative electrode in a 15 A-hr FeS cell. The cell electrolyte was $CaCl_2$-LiCl-KCl, and the cell, which had a resistance of 0.12 ohms, was operated with about 60 percent electrode utilization for 34 cycles at 460°C. Cutoff voltages of about 1.95 charge and 0.8 discharge were used indicating that the negative electrode was cycling between $CaAl_2$ and Al. The cumulative A-hr efficiency was 99.6% over 32 cycles.

EXAMPLE IV (CELL SP-5)

A negative electrode having a powdered mixture of approximately 60 weight percent $Ca_2Si$ and 40 weight percent CaSi was employed in a cell using $NaCl-CaCl_2$ electrolyte and an FeS positive electrode. The cell was found to have plateau voltagea of 1.62, 1.35 and 1.28 at 556°C. It was operated for 8 charge and discharge cycles with about 1.9 volt cutoff on charge and 0.8 volt cutoff on discharge. Approximately 80% A hour efficiency between discharge and charge cycles was obtained.

EXAMPLE V (CELL SP-6)

Particulate Ca Si obtained by a pyrometallurgical reaction of Ca with $CaSi_2$ was vibratorily loaded into a porous substrate of iron foam (available as iron Retimet, a trademark) and wrapped in zirconia and boron nitride cloth for use as a negative electrode in a $Ca_2Si/NaCl-CaCl_2/FeS$ cell. The cell resistance was measured to be 0.18 ohm. Three discharge, open-circuit voltage plateaus of 1.63, 1.35 and and 1.28 V were observed. Charge voltage cutoffs of below 2 V were used to avoid production of calcium-sodium alloy at the negative electrode.

It will be clear that although the above examples give a limited number of active materials for use in the positive and negative electrodes and a limited number of electrolytes, that various substitutions contemplated by the present invention can be made. For example, the positive electrode active material can be $FeS_2$ or other transition metal sulfide or mixtures of various transition metal sulfides. Such mixtures can comprise FeS with approximately 10–15 weight percent $CuS_2$ or $FeS_2$ with approximately 10–15 weight percent $CoS_2$ as well as other metal sulfide additives. Also other chalcogens and chalcogen compounds such as Se or CuSe can be used. Various other alkali metals or alkaline earth metal halides blended in eutectic compositions can be substituted for the $NaCl-CaCl_2$ electrolyte employed in several of the above examples. In the negative electrode active materials can be selected from calcium alloys, intermediate phases and intermetallic compounds including $Ca_2Si$, $CaSi$, $CaAl_2$ and $CaAl_4$. Ternary compounds such as $CaAl_2Si_2$ and the system $Ca(Al,Si)_2$, CaAlSi and other ternary compounds such as CaMgSi may also be appropriate.

It will be clear that the present invention provides a secondary rechargeable electrochemical cell that employs a highly energetic reaction of calcium, in an alloy, with metal sulfides or sulfur in an inexpensive electrolyte. Through use of the calcium alloys the cell is rechargeable notwithstanding sodium salts within the electrolyte which would ordinarily be expected to form molten sodium calcium alloys within the cells.

The embodiments of the invention in which an exclusive property or privilege is claimed are defined as follows:

1. A secondary electrochemical cell including a positive electrode having active material selected from the group consisting of sulfur, a sulfur compound or mixtures thereof, a molten salt electrolyte including calcium ions and a negative electrode having an active material including a solid alloy of calcium and an element selected from groups 1A, 2A, 3A and 4A of the Periodic Table.

2. The electrochemical cell of claim 1 wherein said solid alloy comprises calcium and an element of lower atomic weight than calcium.

3. The electrochemical cell of claim 1 wherein said alloy comprises calcium and an element selected from the group consisting of aluminum, silicon, and magnesium.

4. The electrochemical cell of claim 1 wherein said alloy comprises a solid phase of calcium and aluminum.

5. The electrochemical cell of claim 1 wherein said solid alloy comprises a solid phase of calcium and silicon.

6. The electrochemical cell of claim 1 wherein said alloy comprises a solid, ternary phase of calcium, aluminum and silicon.

7. The electrochemical cell of claim 1 wherein said solid alloy comprises a solid solution of calcium and said element substantially free of phases having calcium metal as the solvent constituent of a substitutional solid solution.

8. The electrochemical cell of claim 1 wherein said solid alloy is an intermediate phase of calcium and at least one of said elements, said phase having compositional limits defined by intermetallic compounds.

* * * * *